United States Patent [19]

Klüter et al.

[11] Patent Number: 5,097,955

[45] Date of Patent: Mar. 24, 1992

[54] TRANSPARENT WRAPPING FOR BULK GOODS

[75] Inventors: Wilhelm Klüter; Harry Krohn, both of Viersen, Fed. Rep. of Germany

[73] Assignee: Feldmuehle Aktiengesellschaft, Dusseldorf, Fed. Rep. of Germany

[21] Appl. No.: 435,423

[22] PCT Filed: May 5, 1988

[86] PCT No.: PCT/EP88/00379

§ 371 Date: Nov. 2, 1989

§ 102(e) Date: Nov. 2, 1989

[87] PCT Pub. No.: WO88/08819

PCT Pub. Date: Nov. 17, 1988

[30] Foreign Application Priority Data

Aug. 5, 1987 [DE] Fed. Rep. of Germany ....... 3715308

[51] Int. Cl.[5] .............................................. B65D 71/08
[52] U.S. Cl. ................................... 206/497; 206/387; 428/34.9; 428/36.6; 428/349; 428/518; 428/520; 428/910
[58] Field of Search .................. 428/34.9, 36.6, 349, 428/518, 520, 910; 206/497, 387

[56] References Cited

U.S. PATENT DOCUMENTS

| | | |
|---|---|---|
| 4,254,869 | 3/1981 | Heier ................................. 206/497 |
| 4,311,660 | 1/1982 | Barham et al. ..................... 428/516 |
| 4,403,464 | 9/1983 | Duncan ............................... 428/349 |
| 4,439,478 | 3/1984 | Ferguson et al. .................. 428/349 |
| 4,447,494 | 3/1984 | Wagner, Jr. et al. .............. 428/349 |
| 4,495,027 | 1/1985 | Wagner, Jr. et al. .............. 428/349 |
| 4,502,263 | 3/1985 | Crass et al. ........................ 428/349 |
| 4,695,503 | 9/1987 | Liu et al. ............................ 428/349 |

Primary Examiner—Merrell C. Cashion, Jr.
Assistant Examiner—D. S. Nakarani
Attorney, Agent, or Firm—Felfe & Lynch

[57] ABSTRACT

In a batch package 20 which includes a stack 6 of individual packages 16, the external film 17 as well as the multilayer film 2 of the individual film 16 include several layers which are bonded to each other. The core layer 3 is made of a polypropylene polymer, the external layers 4, 5 of one of the films are made of a polypropylene copolymer or terpolymer consisting of ethylene or olefins which have 4 to 10 C-atoms, the external layer 21, 22 of the second film are made of acrylic resin. During heat sealing and shrinkage, the external layers 4, 5, 21, 22 of one film are bonded to each other, respectively; however, they are not bonded to the external layers of the second film; i.e. even after the shrinkage and heat sealing the external film 17 is not joined to the individual package 16 and the multilayer film 2 enclosing the latter.

18 Claims, 6 Drawing Sheets

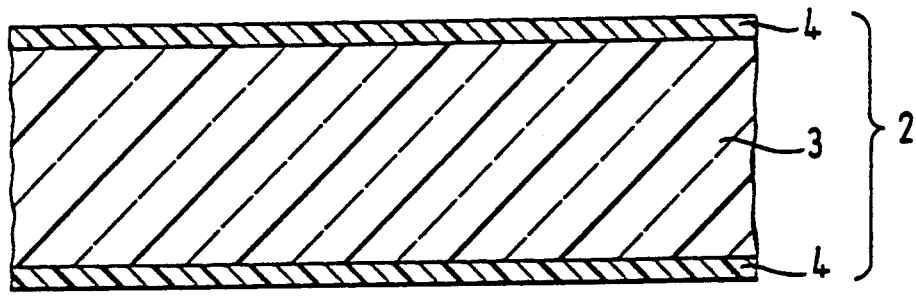
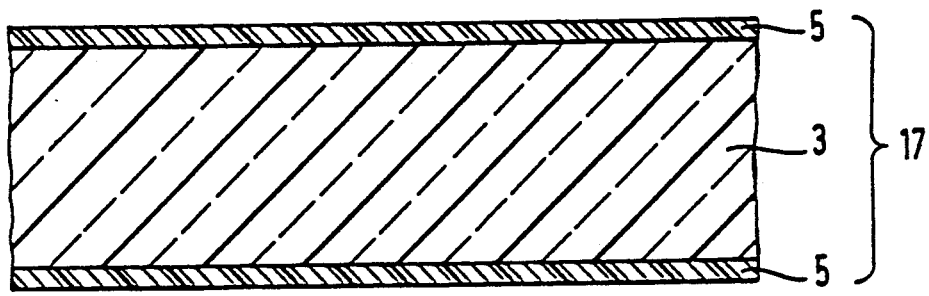
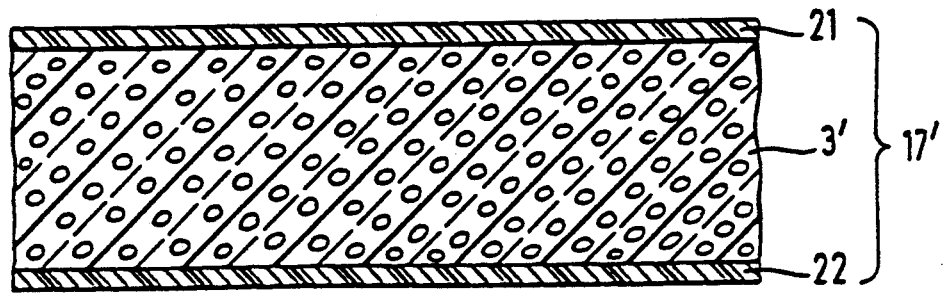

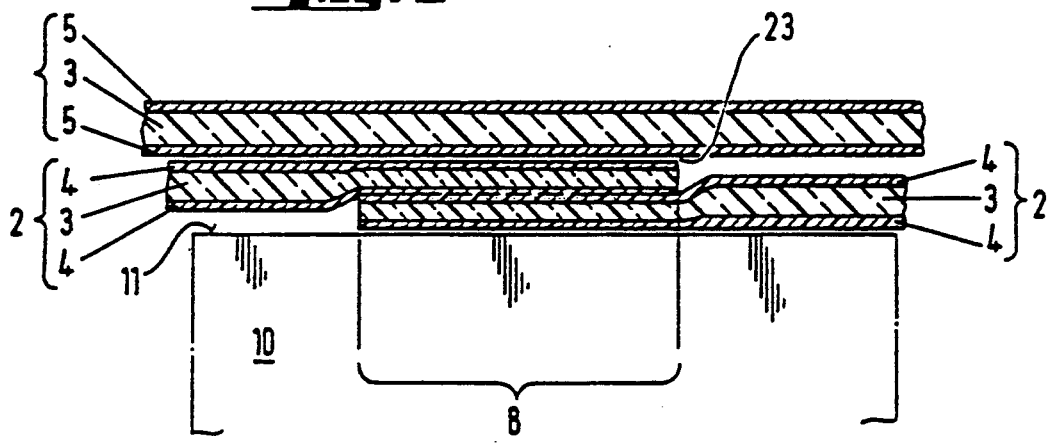
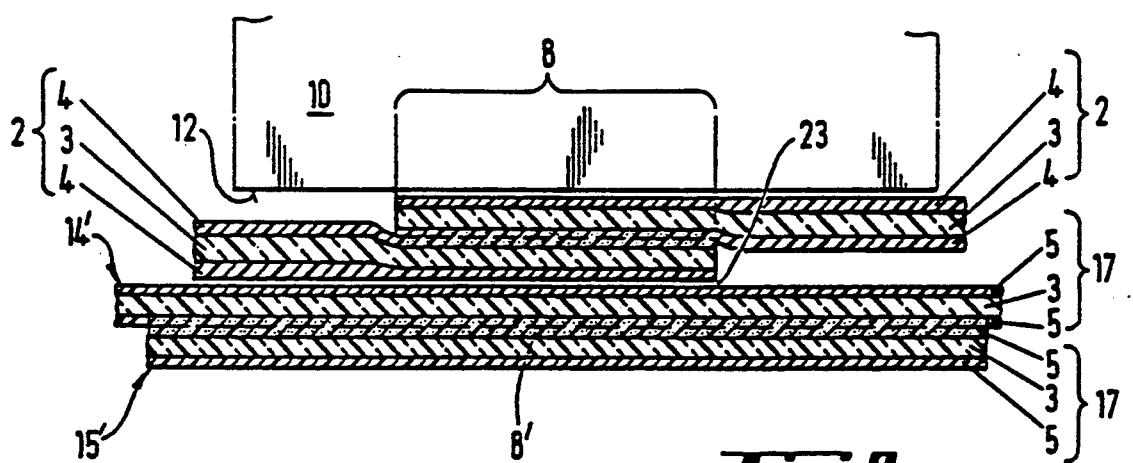

TRANSPARENT WRAPPING FOR BULK GOODS

BACKGROUND OF THE INVENTION

The invention relates to a transparent wrapping for bulk goods which are first wrapped in a plastic film, then shrunk and, subsequently, wrapped in an additional plastic film and also shrunk. For this purpose films of a different composition are used for the individual wrapping and the overall wrapping.

Bulk goods, particularly boxes and cassettes, are in many cases wrapped in transparent film for a more appealing look as well as to provide a tight sealing. After the heat sealing of the film, the wrapping process can be followed by a short shrinkage process resulting in a very close-fitting wrapping which, simultaneously, presents the wrapped goods in a visually very appealing way. At the same time the goods are protected from dust, moisture and contact.

When the goods to be wrapped are small in size, they are usually compiled in batch packages; i.e the already wrapped individual parts are combined to form a larger batch package and then wrapped again. It is the object to select the wrapping such that the contents are visible through both wrappings; i.e. generally a transparent film is also selected for the overall wrapping; the internal wrapping as well as the external wrapping can partially be provided with an imprint. This way of wrapping also causes problems. If the same kind of film is used for both the surrounding wrapping and the individual wrapping, the sealing areas of the surrounding wrapping are bonded to the sealing areas of the individual areas; i.e. when the package is opened, the surrounding wrapping as well as the individual wrapping are destroyed. The same effect occurs when the batch package is subsequently passed through a shrinking oven so as to provide a very close-fitting, smooth wrapping.

In order to prevent a bonding of the internal wrapping to the surrounding wrapping, it is known to coat or spray separating agents onto the individual wrapping. Further, from DE-AS 22 35 748 it is known to incorporate dimethylpolysiloxane oil in the shrinkage film. Both methods have disadvantages insofar as the first one requires an additional operational step and additional material; the second one prevents a bonding of the films when the temperatures are increased for a short period of time as occurs during shrinking. However, the bonding of the sealing joints cannot be avoided such that when the external wrapping is heat sealed, the internal and the external film are still sealed together.

The German publication DE-GM 19 82 961 discloses a batch package wherein the individual packages are made of a compound film which has a 50μ thick ethylene layer and a 20μ thick polyamide layer and the external wrapping is made of 150μ thick polyethylene film. Wrappings of this kind do not exhibit the desired transparency nor can they be stretched tightly by means of shrinking after the heat sealing is completed since the polyamide together with the polyethylene does not provide a sufficiently strong sealing connection.

Hence, it was common to use as a film for the internal wrapping a PVC-film, to stack the goods wrapped therein and provide a wrapping using a polyolefin film and not shrink the latter. However, this adversely affects the visual impression as well as the stability since the goods slide on each other and are thus displaced within the stack.

SUMMARY OF THE INVENTION

It is therefore an object of the present invention to provide a batch package wrapping wherein the surrounding wrapping as well as the individual wrapping contained therein are made of a transparent film which is subject to shrinkage once the wrapping is completed.

Since the object and its achievement can best be explained based on the wrapping of cassettes, this example is used in the following to further describe the invention; however, it is not restricted thereto.

The object is achieved by a transparent wrapping for bulk goods. In order to first provide an individual package, these goods are wrapped in biaxially stretched plastic film, then heat sealed and shrunk; subsequently, they are packed so as to form a batch package wrapped in biaxially stretched plastic film and shrunk. Films of different composition are used for both the individual package and the batch package and characterized by the following features: both films exhibit a thermal shrinkage between 3 and 15%, measured as a free shrinkage in air at a temperature of 150° C. and shrinkage period of 5 minutes. Both films are multilayer films including at least 3 layers. The external layers of the respective films can be heat sealed to one another; at least one external layer of the first film cannot be heat sealed to at least one external layer of the second film.

Due to the combination of two different films contacting one another when individual packages are wrapped in a batch package, there is no bonding between the batch package and the individual package when the latter are heat sealed and shrunk. Further, the defined thermal shrinkage determines the shrinkage force in a way that the films as such envelope the goods to be packed very closely and, hence, give the goods an appealing look. On the other hand, however, the edges of the wrapped cassettes do not pierce the individual packages, thus destroying the latter. The design of the films as multilayer films is essential; i.e. they include at least 3 layers and the external layers of one film, respectively, can be heat sealed on each other. It is thus possible to use simple packing machines and avoid seams.

With respect to the transparency of the packing, an embodiment is of particular significance which determines that the intermediate layer be the base layer for the multilayer film and be made of a propylene polymer. Advantageously, the external layers on the base layer have an identical chemical composition and, preferably, they are made of a polypropylene copolymer or terpolymer of ethylene and/or α olefins which have 4 to 10 C-atoms.

An alternative possibility, i.e. to configure the external layers such that they have different chemical compositions, has proved extraordinarily well; it determines that one of the external layers is made of PVDC and the other one of acrylic resin. A combination of these two types of film provides a good sealing between PVDC and acrylic resin, on the one side, and, on the other side, an excellent gas-tightness is achieved. This is of particular significance when packing chemicals, aromatic substances, food, and substances containing perfume, like soap, since this packing positively prevents escaping of gases from the packing. In such cases PVDC must be used as an internal layer otherwise it easily bonds to the surrounding wrapping when the latter is applied.

In case the demands on gas-tightness are higher, it is possible to make both external layers of polyvinylidene chloride which, in addition, provides a good sealing. In this case stretched polypropylene is also used as a support material for the polyvinylidene chloride. For the second film which is advantageously used for the individual packing polypropylene copolymer or terpolymer consisting of ethylene and/or olefins which have 4 to 10 carbon atoms is preferably used as an external layer for both sides over a base layer of polypropylene.

Selecting polypropylene as a base layer permits producing a crystal clear packing material which envelopes the goods as a high gloss wrapping which is easy to print on and, hence, has an advertising appeal. Advantageously, this biaxially stretched and heat-set film is a coextrudate the external layers of which contain butene or ethylene as a polypropylene copolymer mixture.

It is of no further significance whether this multilayer film is used for the production of an individual package or a batch package. What is of significance is that it can be combined with an additional film which have external layers made of acrylic resin. Advantageously, the acrylic resin is applied in the form of a watery acrylate dispersion; the acrylic resin layer has a thickness between 0.1 and 10 $\mu$m. Particularly preferred is a range between 0.5 and 5 $\mu$m; the lower limit ensures an absolutely reliable adhesion of the films on one another and the upper limit must not be surpassed considering economical factors. It is understood that the layer thickness is also dependent on additional factors of use, e.g. the thickness of the entire film and, consequently, the strength thereof.

EXAMPLE 1

A plastic film roll having a width of 135 mm and the film having a thickness of 25 $\mu$ is inserted in a film wrapping machine for complete wrapping which features front side package lapping and a overlapping seam on the longitudinal side -Ilsemann CM1-. This film is a three-fold laminate having the following structure:

a. 2 $\mu$m polypropylene copolymer;
b. 21 $\mu$m polypropylene, stretched;
c. 2 $\mu$m polypropylene copolymer.

Such a film can be obtained from the firm of Mobil under the brand name MB 400.

In the above film wrapping machine a portion of the film having a length of 181 mm is taken off and cut. Subsequently, a cassette contained in a plastic box is transversely placed onto this portion of the plastic film and, overlapping with the film portion, heat sealed in transverse direction. In the folding station a package lapping is formed and heat sealed at the front end. Following the heat-sealing, the so-wrapped cassette then passes through a shrinking tunnel with hot air circulation. The tunnel temperature is at approximately 180° C., referred to a throughput of 98 packages per minute.

EXAMPLE 2

In the same wrapping machine a plastic film is used which, at the same width, has the following structure. Acrylic resin in the form of a watery acrylate dispersion is applied as layers a and c onto both sides of the center layer b which has a thickness of 22$\mu$ and consists, as in example 1, of stretched polypropylene; the layers are then hardened as usual. The layer thickness obtained is at 1.5 $\mu$m for each of the sides a and c. The lapping of the cassette is identical to the one described in example 1. The same applies to the shrinkage.

EXAMPLE 3

In a film wrapping machine, type Sollas 17, manufactured by Sollas Holland B.V., which completely wraps the goods, is inserted a 195 mm wide roll of a plastic film which has a thickness of 32 $\mu$m. The film is a three-fold laminate having a core of stretched polypropylene. It has a thickness of 29 $\mu$m. The external layers, i.e. the layers a and c consist of acrylic resin and have a thickness of 1.5 $\mu$m, respectively. From this roll a portion having a length of 500 mm is cut off and a stack of prewrapped cassettes is placed onto this portion. 10 cassettes ar placed upright and adjacent to each other on this portion. The lapping, the longitudinal and the front side heat-sealing and the shrinkage are carried out according to example 1.

EXAMPLE 4

According to example 3 a 195 mm wide roll is inserted. In this case, the plastic film has a thickness of 30 $\mu$m and the following structure:

Center layer b polypropylene having a thickness of 26 $\mu$m, stretched,

External coating a and c, polypropylene copolymer, each 2 $\mu$m.

Different from the stack of individual packages used in example 3, which are wrapped up in a laminate according to example 1, now a laminate according to example 2 is used such that the difference is maintained between the film wrapping of the individual packages and the film wrapping of the batch package. As already explained in example 3, the batch package is also passed through a shrinkage tunnel. The temperature is at approximately 180 ° C., the cycle time is at approximately 42 packages per minute. The shrinkage process provides a very close fit of external wrapping to individual wrapping.

EXAMPLE 5

A 195 mm wide roll of a multilayer film having a thickness of 25 $\mu$m is inserted in a film wrapping machine of the type Ilsemann CM 2 featuring a full wrapping. The film is a three-fold laminate having a core made of stretched polypropylene which has a thickness of 22 $\mu$m. The external coatings are made of PVDC and have a thickness of 1.5 $\mu$m, respectively. The film as such can be obtained from the firm of ICI under the brand name Propafilm, type CF. From this roll a portion at a length of 500 mm is cut off and on this portion is placed a stack of prewrapped cassettes; the cassettes are placed on this portion upright and adjacent to each other. The lapping, the longitudinal and front heat-sealing, and the sealing are carried out according to example 1.

BRIEF DESCRIPTION OF THE DRAWINGS

FIG. 5 is an enlarged cross section through the film for the individual pack, FIG. 6 is an enlarged cross section through the film for the ten pack, FIG. 7 is a cross section through a multilayer film having a foamed core layer, FIG. 8 is an enlarged detailed cross section taken along the line VIII—VIII of FIG. 4, FIG. 9 is an enlarged detailed cross section taken along the line IX—IX of FIG. 4.

DETAILED DESCRIPTION OF THE PREFERRED EMBODIMENTS

Figure 1:
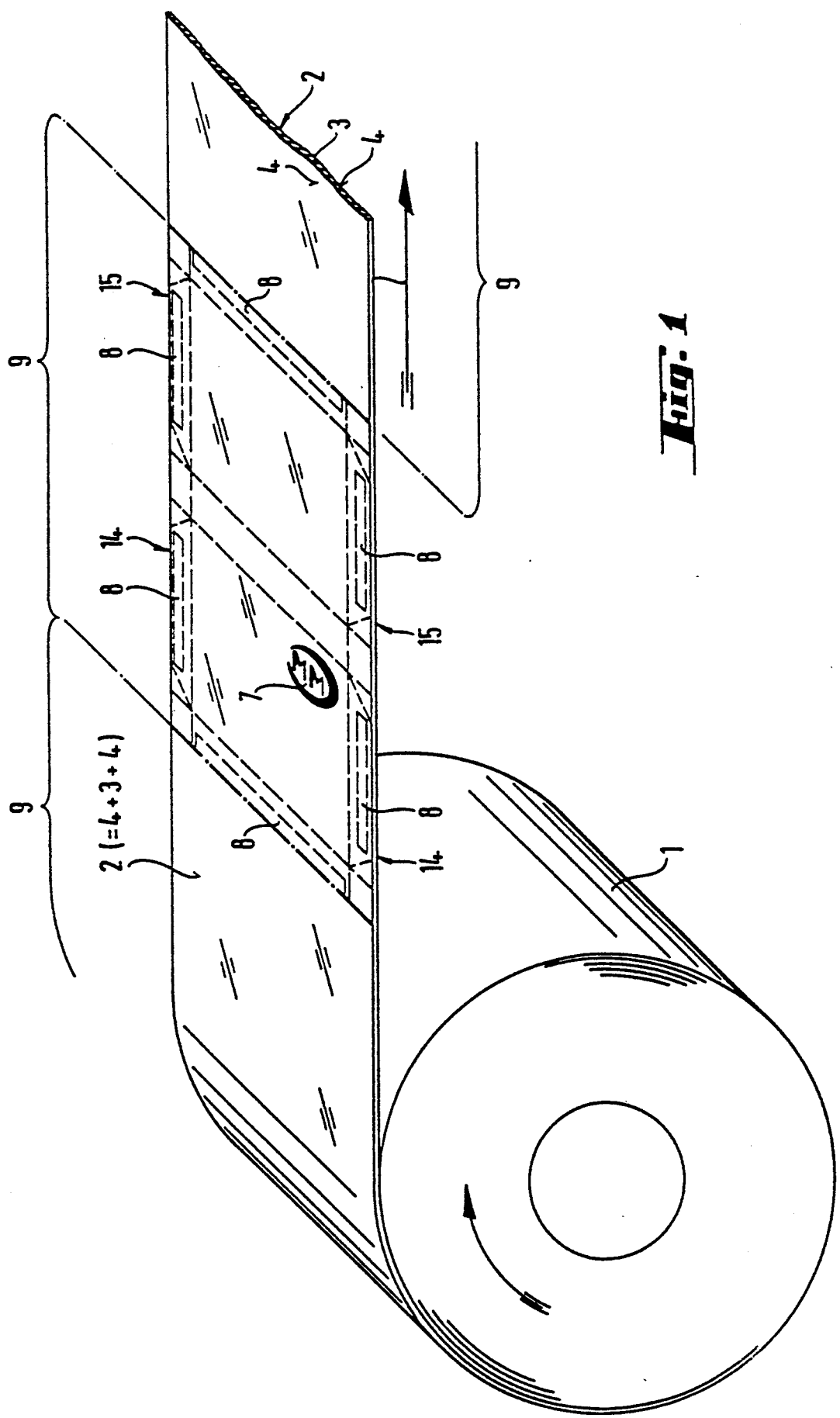
FIG. 1 shows how portions which are not yet separated are taken off the film roll.
Figure 2:
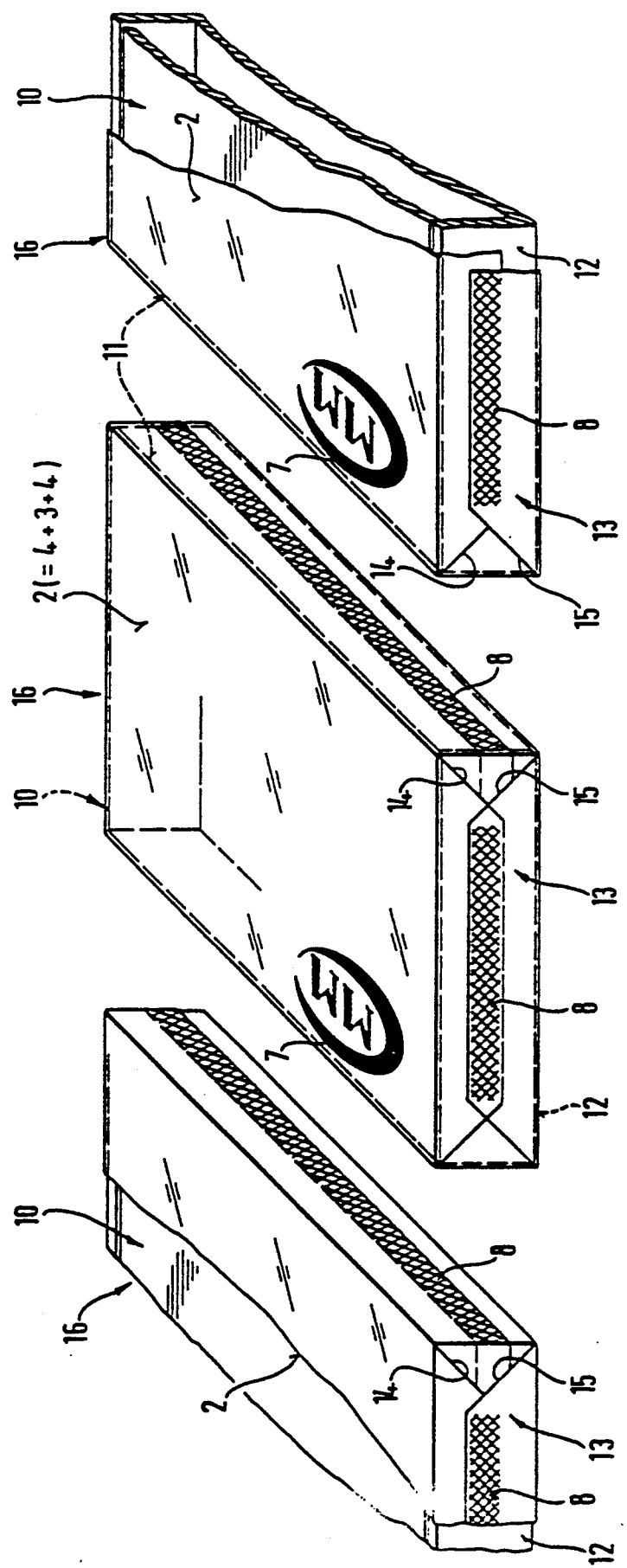
FIG. 2 shows, as a part of this wrapping device, the finally wrapped cassettes.

Referring to FIG. 1, from a multilayer film 2 is taken off, the core layer 3 of which is made of polypropylene polymers. On both sides this core layer 3 has external layers 4 which are made of a polypropylene copolymer mixture of isotactic polypropylene and isotactic polybutene (see also FIG. 5). The film is provided with a counter print 7 which does not extend into the heat-sealing areas 8. In a conventional wrapping machine which is not represented in further detail, the multilayer film 2 is separated into several segments 9 onto which cassettes are mechanically placed transversely to the running direction of the multilayer film. Referring also to FIG. 2, the segment 9 is first folded transversely around the cassette 10 and heat sealed in the sealing area at the longitudinal side 11 of the cassette 10. Subsequently, a package closing 13 is formed by folding at the front sides 12 of the cassettes 10. In the sealing area 8 the top flap 14 is heat sealed to the bottom flap 15. The so completed individual package 16 then passes through a non-represented shrinkage oven; once passed through the latter, the multilayer film 2 fits closely to the cassette 10.

Figure 3:
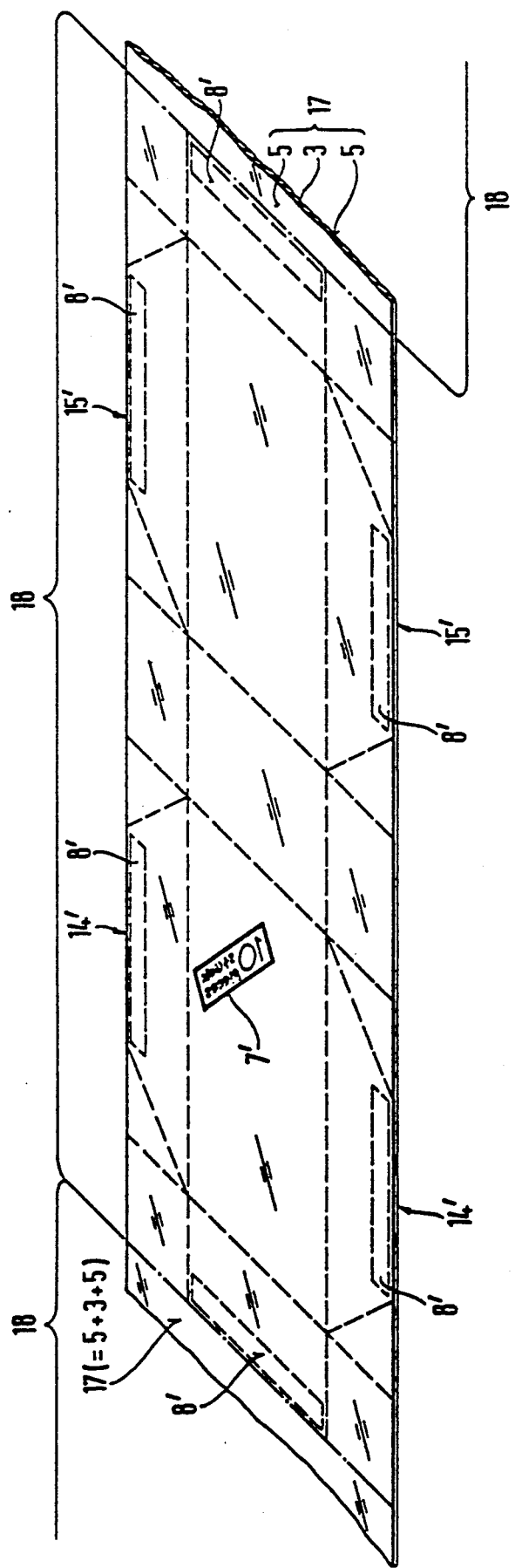
FIG. 3 is a portion of cut off wrapping film for the external lapping of ten wrapped up cassettes.

In a non-represented packing machine ten of these individual packages 16 are combined to a stack and then placed onto an external film 17 which also is provided with counter prints 7 and 7' and is cut to segments 18 (FIG. 3). The external film 17 includes a core layer 3 made of a propylene polymer onto which external layers 5 of acrylic resin were applied (see also FIG. 6). By wrapping the stack of ten individual packages 16 with the segment 18, batch package 20 is formed (FIG. 4); the formation of the package folding 13', 14', 15' and the heat sealing 8' are carried out analogously to the production of the individual package 16. The so-obtained batch package 20 passes through a non-represented shrinkage oven causing the external film 17 to shrink such that it closely fits to the stack of individual packages 16. Neither the shrinking nor the heat sealing causes a bonding of the external film 17 to the multilayer film 2 of the individual package 16, so that the wrapping of the individual package 16 is not damaged when opening the batch package 20.

FIG. 7 shows a cross section through an additional external film 17', which has a core layer 3' made of foamed polypropylene polymer. The external layer 21 is made of a PVDC coating and the external layer 22 has an acrylic resin coating.

Figure 4:
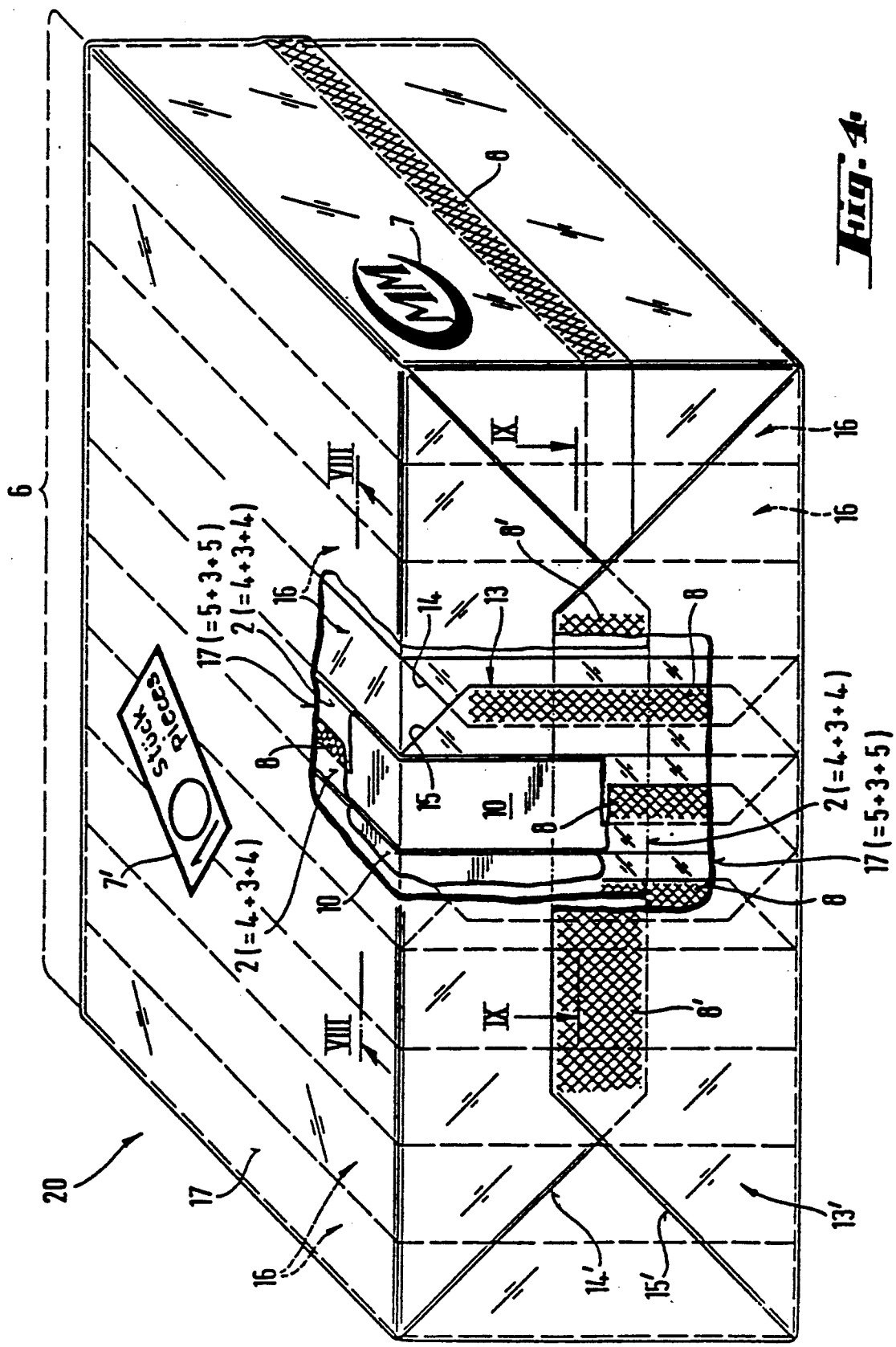
FIG. 4 shows the completely wrapped-up cassettes in a ten pack.

FIG. 8 is a partial section through the batch package 20 taken along the line VIII—VIII in FIG. 4. The external film 17 includes a core layer 3 which has external layers 5 of acrylic resin. The multilayer film 2 also has a core layer 3 of propylene polymer. However, this core layer 3 is provided with external layers 4 which consist of a polypropylene polymer mixture of isotactic polypropylene and isotactic polybutene. As it can be gathered from FIG. 8, there is an air gap 23 between the external layers 4 and 5 even after the shrinkage; the drawing shows this gap highly enlarged since the external layers 4 and 5 are not sealed to each other.

FIG. 9 is a partial section through the batch package 20 taken along line IX—IX in FIG. 4. In this case the sealing area 8' of the batch package is, consequently, represented in a cross section. Despite the heat-sealing of the external film 17 in the sealing zone 8', there is an air gap 23 between the external layers 4 and 5 whereas the respectively identical layers 4 in the sealing area 8 of the multilayer film 2 and analogously the external layers 5 are heat sealed to each other in the sealing zone 8' of the external film 17.

We claim:

1. A batch package comprising a plurality of individual packages each wrapped in a first biaxially stretched and heat-set transparent multilayer plastic film and collectively wrapped in a second biaxially stretched and heat-set transparent multilayer plastic film, both first and second films exhibiting a thermal shrinkage between 3% and 15%, measured as free shrinkage in air at a temperature of 150° C. and a shrinkage time of 5 minutes, said first and second films each comprising a base layer made of a polypropylene polymer and two external layers which are heat sealable to each other, at least one external layer of the first film not being heat sealable to at least one external layer of the second film.

2. A batch package as in claim 1, wherein the external layers of each film have an identical chemical composition.

3. A batch package as in claim 1, wherein the base layer of at least one of the multilayer films is made of a foamed polypropylene polymer.

4. A batch package as in claim 1, wherein at least one external layer of one of said multilayer films is a copolymer of propylene with at least one compound selected from the group consisting of ethylene and olefins which have 4 to 10 C-atoms.

5. A batch package as in claim 1 wherein at least one of the first and second multilayer films is coextruded, biaxially stretched and heat-set.

6. A batch package as in claim 4, wherein the external layer is a mixture of isotactic polypropylene and isotactic polybutene.

7. A batch package as in claim 4, wherein said at least one external layer is a copolymer of propylene and ethylene.

8. A batch package as in claim 7, wherein said copolymer of propylene and ethylene has 1 to 6 wt. % ethylene.

9. A batch package as in claim 4, wherein said copolymer is a copolymer of propylene and butene-1 which contains 10 to 15% butene-1.

10. A batch package as in claim 1 wherein at least one of the external layers of the second film are made of acrylic resin.

11. A batch package as in claim 10, wherein the acrylic resin is applied in the form of a watery acrylate dispersion.

12. A batch package as in claim 10, wherein the acrylic resin layer has a thickness of 0.1 to 10 μm.

13. A batch package as in claim 1, wherein at least one of the external layers of one of said multilayer films is made of PVDC and at least one of the external layers of the other of said multilayer films is made of acrylic resin.

14. A batch package as in claim 1 wherein both external layers of one of said multilayer films are made of PVDC and both external layers of the other is made of a copolymer of propylene with at least one compound selected from the group consisting of ethylene and alpha-olefin with 4 to 10 C-atoms.

15. A batch package as in claim 1 wherein both external layers of one of said multilayer films are made of PVDC and the external layers of the other is made of a propylene terpolymer with at least one compound selected from the group consisting of ethylene and olefins having 4 to 10 carbon atoms.

16. A batch package as in claim 1 wherein the external layer of one of said multilayer films is a propylene terpolymer with at least one compound selected from the group consisting of ethylene and olefins having 4 to 10 carbon atoms.

17. A batch package as in claim 16 wherein the external layer is a mixture of isotactic polypropylene and isotactic polybutene.

18. A batch package as in claim 16 wherein the external layer is a terpolymer comprising of propylene, ethylene and a C4 to C10 olefin.

* * * * *